United States Patent [19]
Lantieri et al.

[11] Patent Number: 5,571,431
[45] Date of Patent: Nov. 5, 1996

[54] METHOD AND APPARATUS FOR CONTROLLING AND SIMULTANEOUSLY DISPLAYING ARC WELDING PROCESS PARAMETERS

[75] Inventors: Louis T. Lantieri, Mission Viejo; Douglas M. Kensrue, Irvine, both of Calif.

[73] Assignee: MK Products, Inc., Irvine, Calif.

[21] Appl. No.: 414,931

[22] Filed: Mar. 31, 1995

[51] Int. Cl.$^6$ .................................................. B23K 9/095
[52] U.S. Cl. .................................... 219/130.01; 219/60 A
[58] Field of Search ......................... 219/130.01, 130.31, 219/130.33, 130.32, 60 A; 345/150; 346/46

[56] References Cited

U.S. PATENT DOCUMENTS

| | | | |
|---|---|---|---|
| 4,144,992 | 3/1979 | Omae et al. | 219/60 A |
| 5,122,733 | 6/1992 | Havel | 345/150 |
| 5,293,184 | 3/1994 | Ishizuka | 346/46 |

OTHER PUBLICATIONS

MK Products, Inc., STI Division, ATW–Advanced Tube Welder Model 9211–Operating Manual (Rev. B. ( Nov. 27, 1991).

*Primary Examiner*—Clifford C. Shaw
*Attorney, Agent, or Firm*—Harold L. Jackson

[57] ABSTRACT

A system (and method) of controlling and simultaneously displaying arc welding torch parameters includes a power supply for supplying weld voltage and current to the torch in accordance with demand signals from a computer. The computer also supplies a demand motor speed to a motor for controlling the travel speed of the torch electrode relative to a workpiece or the fed rate of a filler wire to the weld area. The actual values of the weld voltage/current and the motor speed are fed back to the computer and displayed on a video color display in separate colors and in real time to enable on operator to readily correlate the actual with the demand parameter values. The position of the electrode relative to the workpiece is also fed back to the computer for presentation on the video display. In addition, deviations of the individual actual parameter values from acceptable tolerance limits are highlighted on the display.

17 Claims, 6 Drawing Sheets

METHOD AND APPARATUS FOR CONTROLLING AND SIMULTANEOUSLY DISPLAYING ARC WELDING PROCESS PARAMETERS

BACKGROUND OF THE INVENTION

1. Field of the Invention

The present invention relates to a method and apparatus for controlling the parameters of an arc welding process and displaying such parameters.

2. Description of the Prior Art

Arc welding is a fusion welding process in which the heat to create the weld is obtained from an electric arc generally set up between a workpiece (or base metal to be joined or repaired) and an electrode. The arc plays between the workpiece and the electrode.

In some applications a filler metal in the form of a consumable wire, which may or may not function as the electrode, is used to supply metal to the weld area. The arc may be shielded with an appropriate flux or may be submerged in an inert gas.

Tungsten inert gas ("TIG") welding processes use a nonconsumable tungsten electrode and an inert gas such as argon. A separate filler wire may be used in the TIC process if desired. Metal inert gas ("MIG") welding processes use a consumable electrode i.e., steel, aluminum etc. with an inert gas. In either process, the torch carrying the electrode is moved along the workpiece either manually by an operator or automatically by a machine. The arc or weld voltage and current determine the quantity of heat being applied to the workpiece. The resulting weld is largely determined by the weld heat, the electrode travel speed, the size of the workpiece, and where a filler wire is used, the feed rate of the wire.

The desired or demand weld voltage and current for arc welding torches is supplied by conventional power supplies, for example, of the switching type via analog signals from a controller. The supplies may provide current of one polarity i.e., d.c. or reversing polarity, i.e., a.c. The supplies may be controlled to provide a single level output or a modulated output wherein the current varies from a high to a low level at a preselected pulsing rate, i.e., 100 pulses/sec.

Optimum weld process parameters with acceptable tolerances may be determined for a particular workpiece empirically or by trial and error. However, the actual weld parameters will generally differ to a lesser or greater extent from the desired or demand values due to several factors. For example, the length of the arc gap, i.e., distance from the electrode to the workpiece and the resulting weld heat may change due to irregularities in the surface of the workpiece where the electrode is moved via a machine and/or irregularities in the movement of the electrode by an operator in a manual operation. The speed of the electrode travel may also vary from the desired speed resulting in too much or too little weld heat in a given location.

There is a need to provide the operator with feedback in the form of the actual welding process parameters as well as deviations thereof from the demand values which exceed pre-established tolerances so that a defective or marginal weld can be readily ascertained. One prior art TIG system which provides some feedback information has been distributed by MK Products Inc. of Irvine, Calif., (the assignee of this application) under the model namer Advanced Tube Welder, ("ATW"). The ATW system was designed to form a butt weld between two tubular sections by utilizing a motor drive to move a tungsten electrode around the circumference of the tube ends to be welded. The system included an IBM compatible computer with a monochrome or black and white cathode ray tube or monitor for displaying the demand values for the high and low pulsed welding current, slope current and motor speed in alpha numeric symbols. The display included a bar graph showing the instantaneous values of the actual weld voltage, weld current and motor speed. The tube was divided into preset time periods or levels, for example, with four levels representing one complete pass of the electrode around the tube.

It was difficult for an operator to readily correlate the elapsed time as displayed with a particular location of the electrode relative to the tube in the ATW system. Furthermore, it was often difficult for an operator to correlate the demand and actual values of the displayed weld process parameters. With respect to deviations the ATW system recorded only the first fifteen and the last instances in which each parameter exceeded preset tolerance levels on a strip chart recorder, requiring, as a practical matter that the weld be completed before deviations could be ascertained. Further, the deviations were recorded on an elapsed time basis, versus electrode position on the tube, making it somewhat difficult to correlate a weld parameter deviation with a point on the welded tube.

The computer in the ATW system controller was programmed in an auto procedure generation mode to set the weld voltage, current and motor speed at optimum values for a given diameter and tube wall thickness. However, the values were based on time instead of electrode or weld position in degrees from a starting point. For example, the controller would set the weld current at a certain level for X seconds and then at a different level for Y seconds. Again the correlation of the time with the position of the electrode (or torch) was not readily discernable.

The present invention overcomes to a large extent the above as well as other disadvantages of the prior art.

SUMMARY OF THE INVENTION

The method and system of controlling and simultaneously displaying torch welding parameters, in accordance with the present invention, includes the steps of and apparatus for supplying weld voltage and current to an arc welding torch and a motor controller for controlling a motor which sets the travel speed of the torch electrode relative to the workpiece or the feed rate of a consumable wire supplied to the weld area. The actual values of at least two and preferably all three of the above weld process parameters are displayed on a color display, such as a color video monitor, in real time. Each parameter is displayed in a different color to enable an operator to readily correlate any given parameter with the welding operation taking place at that time.

The position of the torch or electrode relative to the workpiece may also be displayed in real time on the color display. In addition, parameter deviations from preset tolerance limits may be highlighted on the display in real time. The analog values of the several parameters may be displayed in bar graph and in waveform format.

In addition, data representing each of the parameters and deviations thereof which exceed the tolerance limits may be recorded to allow a review of the entire welding process after the weld is completed. Also, the optimum weld process parameters may be calculated and displayed as demand values on the color display in the same colors associated with the actual displayed values for a given workpiece size and material.

The method and apparatus of the present invention may best be understood by reference to the following description taken in conjunction with the accompanying drawings wherein like components in the several figures are designated by the same reference numerals.

DESCRIPTION OF THE PREFERRED EMBODIMENT

Figure 1:
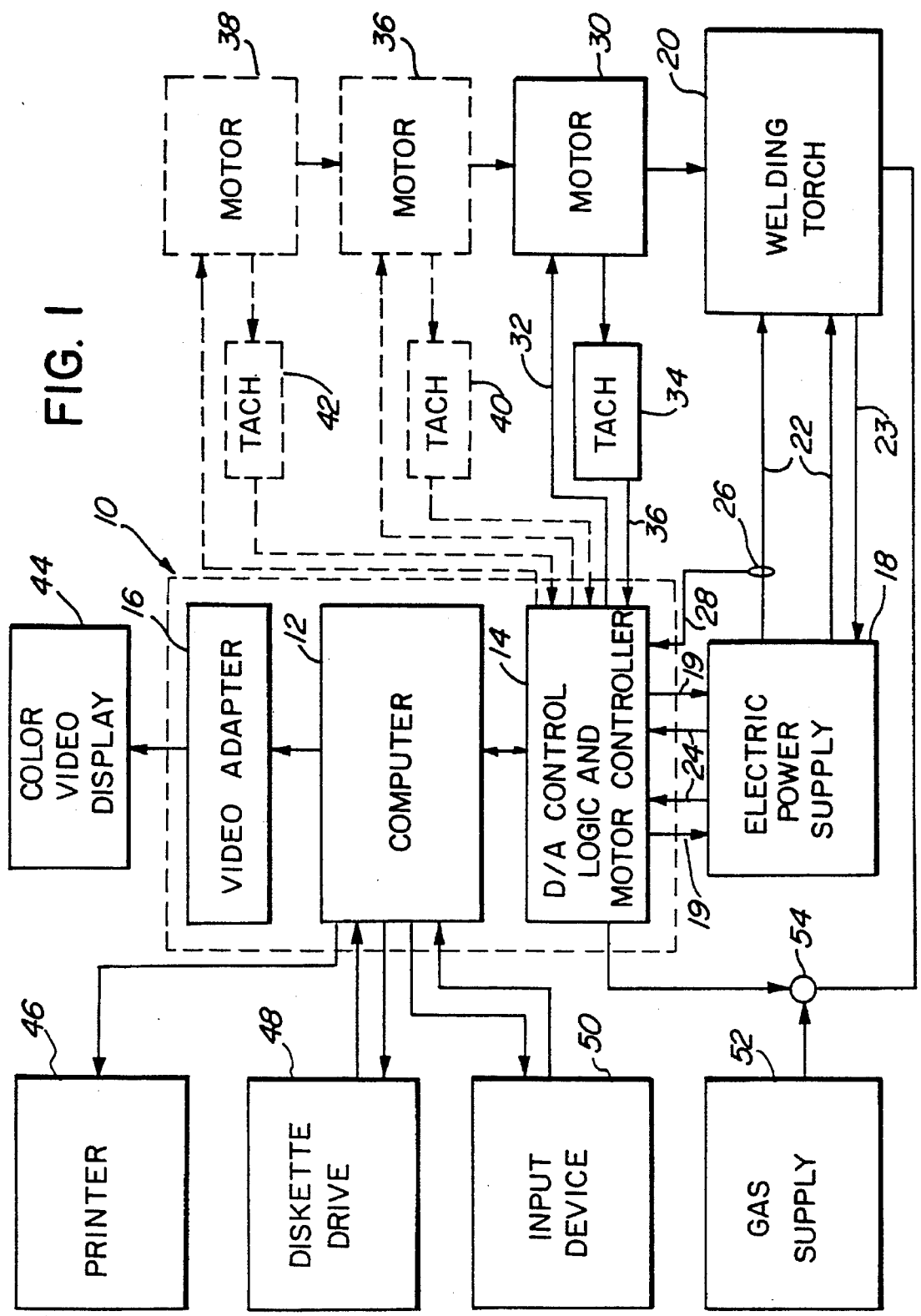
FIG. 1 is a block diagram of the control and display system of the present invention.

Referring now to the drawings and particularly to FIGS. 1–7, a digital system controller 10 in accordance with the present invention comprises a digital computer 12, a digital/analog (D/A) control logic and motor control circuit 14 and a video adaptor 16. The controller 10 controls a power supply 18 which supplies the weld voltage and current to a welding torch 20. The power supply may be of the conventional switching type which converts an a.c. standard outlet voltage (120 v or 240 v) into d.c. voltage. The d.c. voltage may be modulated at a preset pulse rate, i.e., between 0.00 and 9.99 seconds/per pulse to provide a high current level and a low current level output 22 to the welding torch. The values of the weld voltage, weld current and modulation rate demanded of the power supply are determined by output signals from the digital computer which are converted to analog signals via the D/A control logic circuitry 14 and supplied to the supply 18 via leads 19. Such output demand signals may be time multiplexed. These weld process parameter values are commonly referred to as demand values.

The actual values of the weld voltage and current supplied on leads 22 to the torch will generally vary from the demand values to some extent for the reasons discussed previously. The actual (analog) value of the weld voltage as measured across the supply output leads 22 are transmitted to the D/A control logic circuitry via leads 24 for conversion to a digital format and then to the computer. The actual value of the weld current is supplied to the computer via current sensing element 26, lead 28 and the D/A control logic as illustrated.

The traveling speed of the electrode relative to the workpiece or the feed rate of a consumable wire electrode, depending upon the particular torch being used, is determined by a d.c. motor 30. The motor 30 is controlled by an appropriate signal from the computer via the motor control circuitry 14 on lead 32. The supply current to the motor 30 may be of the conventional pulse-width-modulation type. A tachometer 34 provides a feedback signal (representing the actual motor speed) to the computer on lead 36 as illustrated.

Two additional motors 36 and 38, shown in dashed lines, may be used to supply a consumable wire to the weld area (where the motor 30 controls the electrode/workpiece speed) and an oscillatory motion of the electrode for a particular welding torch arrangement as will be explained in connection with FIGS. 8 and 9.

The speed of the motors 36 and 38 are controlled by the computer via the motor control circuitry 14. The actual motor speed is feedback to the computer via tachometers 40 and 42 as shown in FIG. 1.

Figure 2:
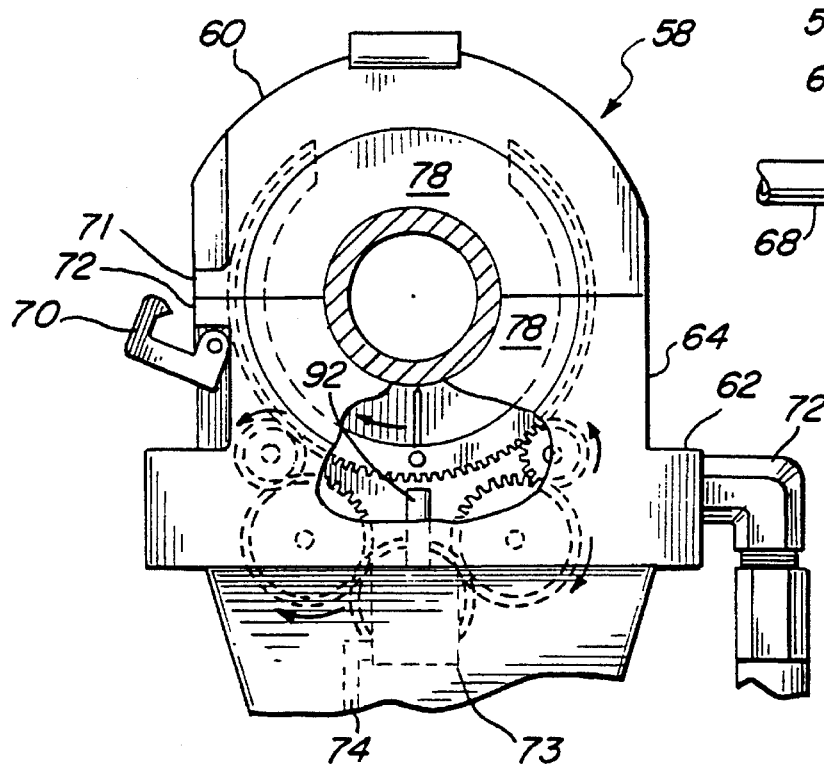
FIG. 2 is a front elevational view of a weld head and TIG torch assembly for butt welding tubes which may be used with the system in FIG. 1.
Figure 3:
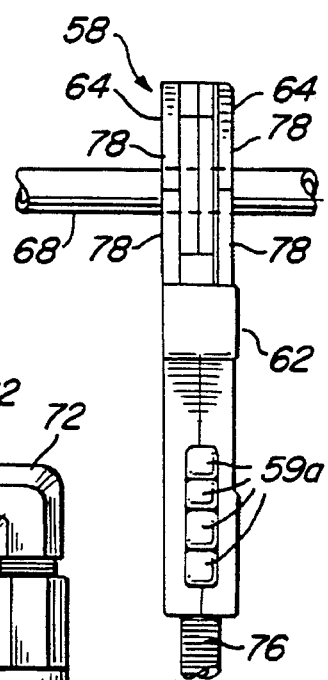
FIG. 3 is a side view of the weld head/torch assembly of FIG. 2.
Figure 4:
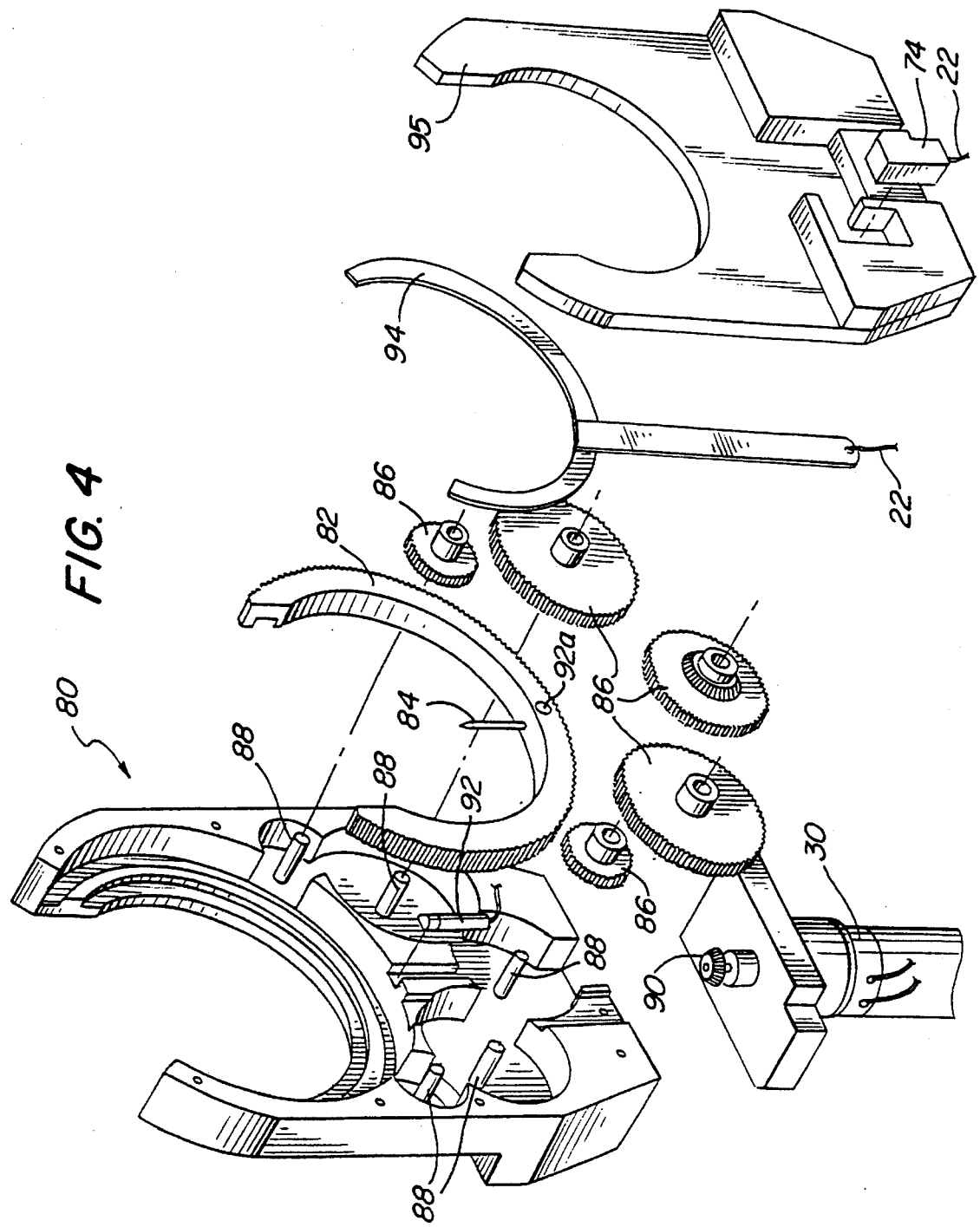
FIG. 4 is an exploded view of the inner components of the assembly of FIGS. 2 and 3 showing the torch components.

Signals representing the actual as well as many, if not all, of demand welding process parameters, i.e., welding current etc., are supplied by the computer, on a real time basis, to the video adapter for conversion to video signals which drive a color video display 44. Each parameter is displayed in a different color. For example, the following colors may be used to display the several parameters:

Red—Weld Current
Amber—Weld Volts
Green—Motor Speed-Representing Torch Travel Speed
Magenta—Motor Speed-Representing the Feed Rate of A Filler Wire
Cyan—Motor Speed Representing an Oscillating or Pulsating Motion of the Torch
Blue—Time Variables Deviations of the actual from the demand parameters which exceed predetermined tolerance levels during the welding process are supplied to a printer 46 to provide a printed record of such deviations correlated with the time of occurrence and location of the electrode (where it is controlled by a motor) as will be illustrated in connection with the operation of the tube welding torch of FIGS. 2–4.

A diskette drive 48 stores, on a real time basis, the actual and demand welding process parameters as will be explained in more detail in connection with FIGS. 6 and 7. Information may be inputted to the computer by an appropriate input device 50 such as a conventional key board 48 or by the hand held control keypad 56 of FIG. 5. Information may also be inputted from a prerecorded disk via drive 48.

Inert gas from a tank or reservoir 52 is supplied to the welding torch via a valve 54 which is controlled by the computer via the A/D circuitry 14.

Figure 5:
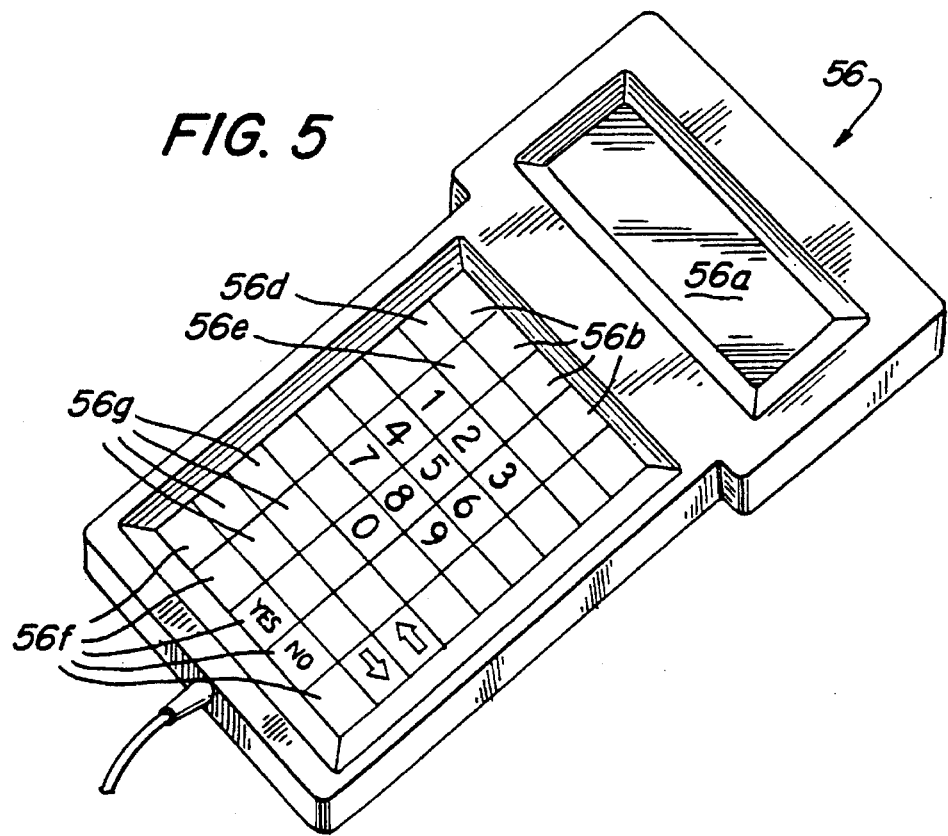
FIG. 5 is a perspective view of a hand-held key pad which may be used as an input device with the control system of FIG. 1.

Referring now to FIG. 5, the hand held control keypad 56, designed for use with the tube welding torch of FIGS. 2–4, includes an LCD screen 56a and the following buttons:
1) Menu buttons—56b;
2) Welding function control buttons such as a start/stop button 56c, a final slope/home button 56d, which if pressed during the welding process will skip all remaining weld levels or sectors and initiate the final slope and return the torch electrode to its home position e.g., at the 3 o'clock position;
3) Next level/GAS—56e, which if pressed during welding results in a jump from the current to the next program level or sector—If pressed at any other time will cause the valve 54 to open or close if already open;

4) Acceptance buttons 56f, which allow the operator to affirm, negate, select and accept data such as the demand welding process parameters displayed on the LCD screen 56a;

5) Scaling buttons 56g, which allow the operator to increase or decrease the weld current or the motor speed during a welding or testing procedure; and 6) Jog buttons 56h, which may be used to actuate the motor controlling the electrode movement to move the electrode clockwise or counterclockwise.

It should be noted that the hand held control unit is optional and need not be connected to the computer.

Referring now to FIGS. 2–4, the tube welding torch and weld head assembly 58 comprises a base section 59 formed of an insulating material, an upper replaceable cartridge unit 60, and a torch assembly (shown in FIG. 4) mounted on the base and extending upwardly inside the cartridge. The cartridge unit 60 comprises a rectangular lower rectangular base 62 with an opening therein to fit over a torch assembly, lower spaced plate sections 64 and upper plate sections 66 hinged thereto. The upper plate sections may be rotated clockwise, as pictured in FIG. 4, to receive tube sections 68 to be welded. Hooks 70 clamp protruding tongues 71 of the upper sections 66 to the protruding tongues 72 of the lower sections 64 to secure the tubes to the welding head. The cartridge unit is formed of a conducting material such as aluminum or steel. The cartridge unit base includes a downwardly extending leg 73 on one side thereof which engages a cooper shoe 74 mounted on an end plate of the torch assembly to return the ground current to the power supply.

The hand held base section 59 of the torch weld head assembly includes four buttons 59a which provide the same functions as the buttons 56c, 56d, 56e and 56f in the hand held keypad 56. Gas is supplied to the lower section of the cartridge via fitting 72 and flexible conduit 74. Supply current wires are contained within another flexible conduit 76 secured to the base 59. Split collar or collet sections 78 for securing the tubes to be welded are mounted in the upper and lower sections of the cartridge as illustrated. Collar sections with different sized openings to accommodate a variety of tube diameters may be used with the cartridge.

The welding torch, shown in the exploded view of FIG. 4, comprises a horseshoe shaped housing 80 made of a high temperature plastic or other suitable insulating material. A horse-shoe-shaped-ring gear 82, which carries tungsten electrode 84, is rotatably mounted in the housing 80. Gears 86, supported on shafts 88, are driven through a level gear or pinion 90 by a motor such as motor 30 mounted in the base 59 for this particular torch arrangement. The ring gear 82 carries a magnetic insert 82a which actuates a reed switch 92, mounted in the housing 80. The reed switch provides a position reference signal to the computer via lead 23. A horseshoe shaped current supply brush 94 is also secured to the housing 80 and engages one side of the metal ring gear 82 for conducting current from the supply to the gear and the electrode. An end plate 94, also made of an insulating material, is secured to one side of the housing 80 to isolate the gears 82 and 86 from the metal cartridge 60. The copper shoe 74 is mounted in the end plate 94 and makes contact with the cartridge when it is mounted on the base 59.

The computer 12 is programmed to automatically set the optimum weld parameters for a given tube outside diameter (OD) in inches, wall thickness (WT) in inches and electrode travel speed in inches/minute (IPM), where IPM=the motor speed in RPM·OD·π. The programmed algorithm is based on a pulsed d.c. current where:

Current High Level=IMP·WT·1000·0.16985 (WT·0.0029+ 0.8116)

Current Low Level=⅓ of the high level current

Current Drop Per Revolution=(0.075−WT)·1.25·current high for WT<0.075

Current Drop Per Revolution=0 for WT≧0.075

Pulse Time High=Pulse Time Low=WT·2.5

The electrode gap for the torch of FIGS. 2–4, which is preferably set at 0.060 inches, can be considered to be constant in the tube welding procedure, although surface deformities in the tube ends may result in minor changes in the electrode gap.

In operation of the apparatus of FIGS. 1–5, the demand weld process parameters are set by the above algorithm or by previously recorded parameters on a disk or by the operator. The selected demand parameters are displayed on the video screen 44 except for the demand weld voltage since it is essentially the same as the actual weld voltage as feedback to the computer.

Figure 6:
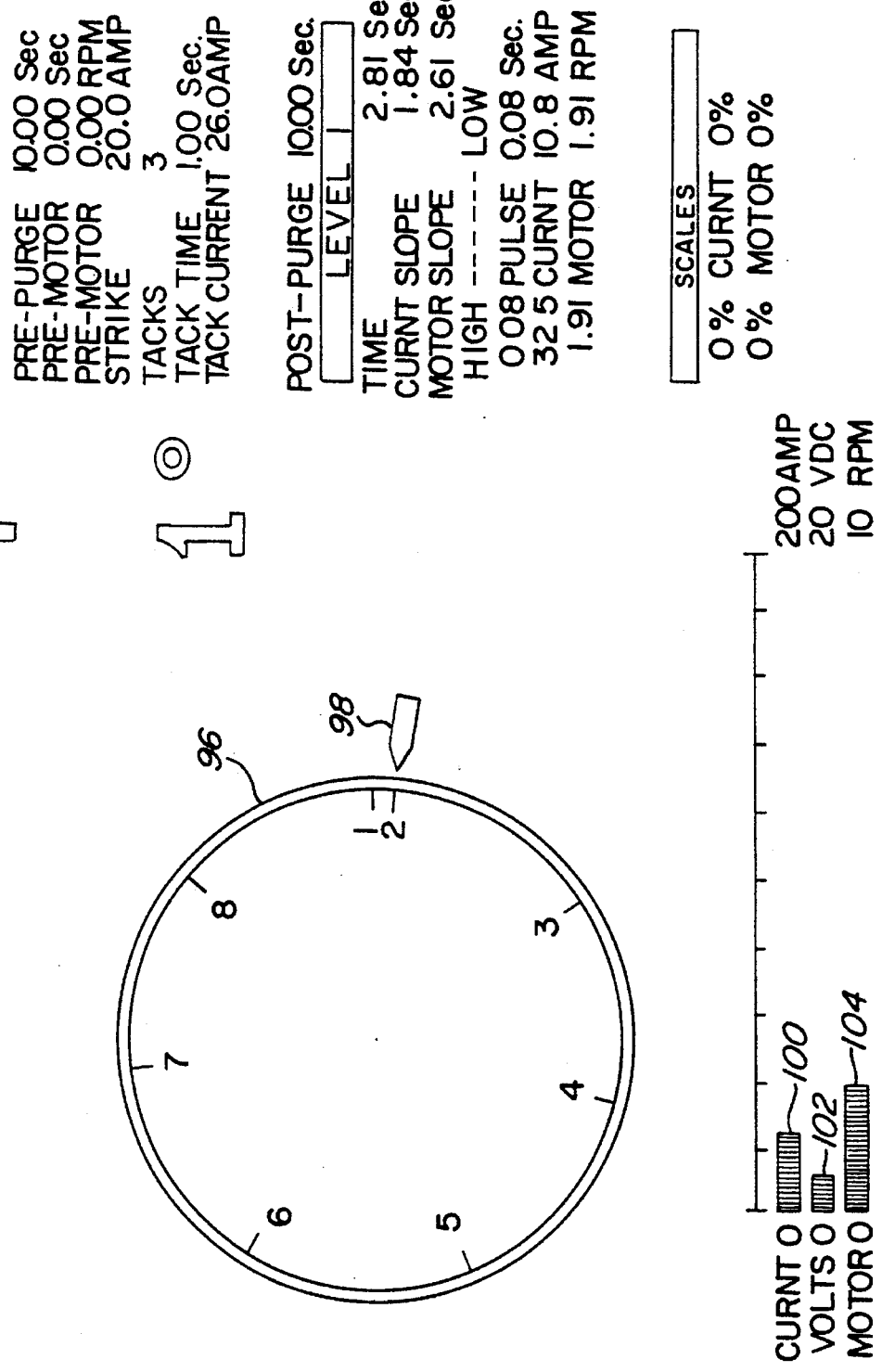
FIG. 6 represents a picture of the weld process parameters as they may appear on the top half of the color video display screen of FIG. 1.
Figure 7:
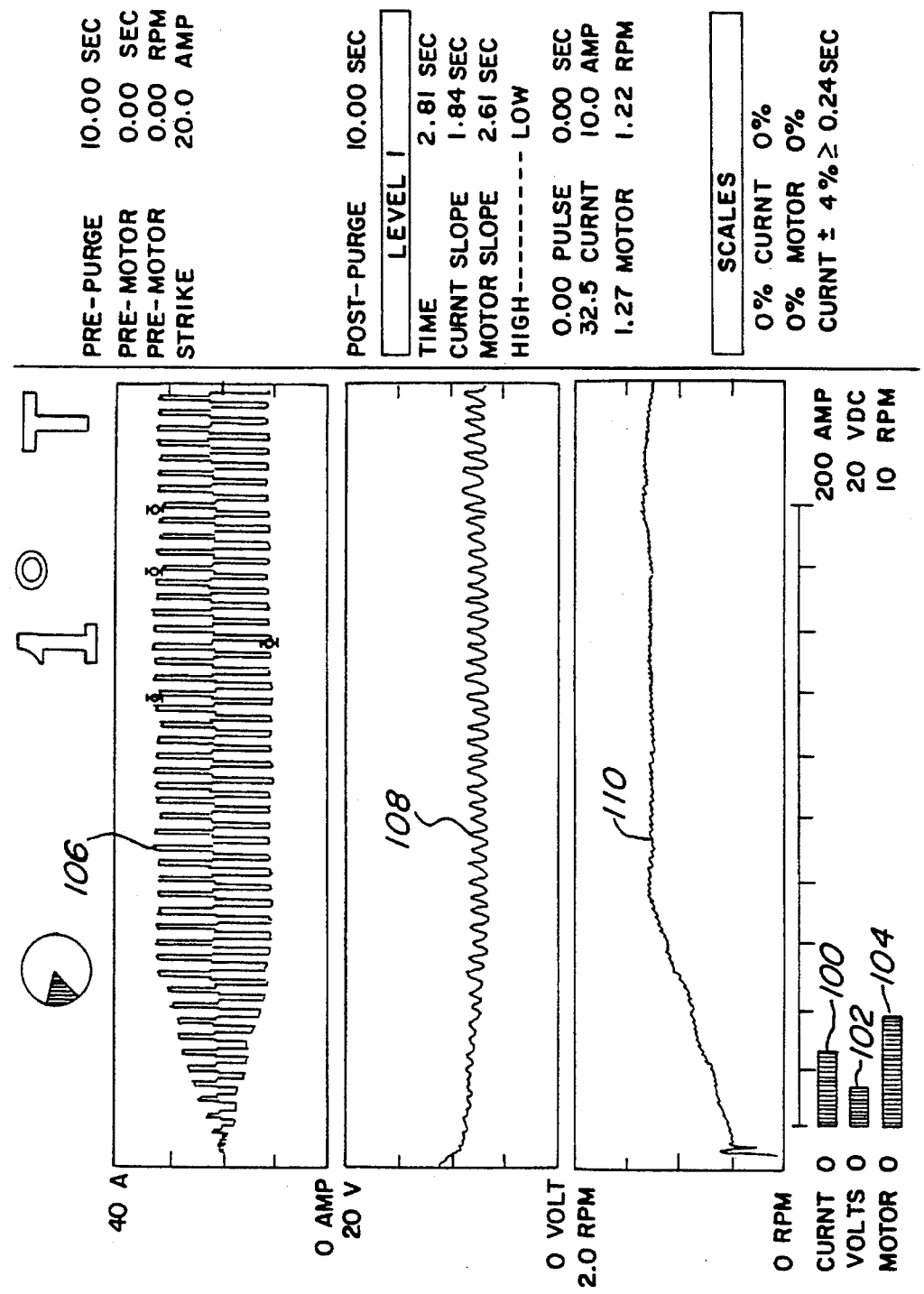
FIG. 7 represents a picture of weld process parameters as they may appear on the bottom half of the video display screen of FIG. 1.

FIGS. 6 and 7 illustrate the demand and actual parameters as displayed on the top and bottom portions of the video screen 44 during a test mode as indicated by the capital T appearing at the top center of each picture. The top right hand side of each picture, FIGS. 6 and 7, contains information concerning the pre-purge period e.g., after the gas valve 54 is opened to immerse the weld area with the inert gas. The pre-motor run time before an arc is struck in terms of seconds and RPM is set at 0, in this example, and preferable displayed in green. The strike current, set at 20.0 amps, is preferably displayed in red. The number of tacks to secure the ends of the tubes before the main welding operation begins is set at 3, i.e., at the 6, 9, and 12 o'clock positions. The tack time and tack current is set at 1.0 seconds and 26 amps, respectively, with the current again being displayed in red. The level or sector of the tube being welded is designated as level 1 which corresponds to the sector between the numerals 1 and 2 on the circle 96 representing the tube, as depicted on the left side of the figures. The start position for the weld is at 3 o'clock, as represented by numeral 1. A torch position arrow 98, as displayed in FIG. 6 adjacent the tube 96, represents the position of the electrode with respect to the tube. This position is fixed by the signal from the reed switch 92 and the signal from the tachometer 34. The position of the weld electrode relative to the start position i.e., 3 o'clock, is also displayed in degrees on both FIGS. 6 and 7 with 1° being shown in the figures.

The tube and the number of welding levels or sectors can be divided into any convenient number. In FIG. 6, the tube is divided into eight levels or sectors as indicated by the numerals appearing on the inside of the tube 96 with the level one consisting of only a few degrees.

The information depicted under the Post-Purge and level 1 notations is self explanatory with the demand weld time, current and motor speed parameters being displayed in blue, red and green, respectively. The demand current slope information represents the time that the current will take to slope from the strike current to the level indicated, i.e., level 1 in this case.

The motor slope represents the time required for the motor to slope from zero RPM to the value set at the level indicated. It should be noted that the current and motor slope may differ from level to level as a result of heat build-up in the workpiece or as a result of tapering off of the weld heat at the conclusion of the welding operation. The demand high and low values of the modulated current (e.g., 32.5 and 10.8 amperes) as well as the current pulse time (e.g., 0.08 seconds per cycle) are shown in red. The information displayed below the scales box in FIG. 6 illustrates parameter input changes in percentages from the auto procedure generated values. Such changes may be made by the operator as discussed previously.

The bar graphs in the bottom left hand corners of each figure represent the instantaneous analog values of the actual weld current, weld voltage and motor speed as shown in red, amber and green, respectively. This information and the position of the arrow 98 allows an operator to readily discern what the actual values of these parameters are at any point in the welding operation.

FIG. 7 contains, on the upper left side, graphs of the waveforms of the actual weld current shown in red (designated 106), weld voltage shown in amber (designated 108) and motor speed shown in green (designated 110) over a set time period. Under the scales box in FIG. 7 a tolerance limit for the weld current is displayed and a deviation symbol φ is displayed on the graph 106 indicating each instance that the weld current deviated from the demand current beyond the tolerance level.

The information displayed on the video screen, as represented by the example shown in FIGS. 6 and 7 is recorded on a disc via the diskette drive to provide a permanent record of the weld parameters during the entire welding operation. The detected deviations are also recorded by the printer and an example of such recorded information is shown below:

by arm 134, mounted for movement up or down via a knob 136 and for movement toward or away from the carriage base 123 via knob 138 as shown. A motor 140 mounted on bracket 132 causes the torch 112 to swivel and provide an oscillating motion of the electrode wire 116 relative to the workpiece as is illustrated. In the embodiment of FIG. 9 the motors 30, 36, and 38 of FIG. 1 can function as the motors 128, 114 and 140. A suitable position sensor (not shown) such as the magnetic insert and microswitch described in connection with FIGS. 2–4 may be incorporated into the track and carriage for providing electrode/workpiece position information to the computer.

Figure 9:
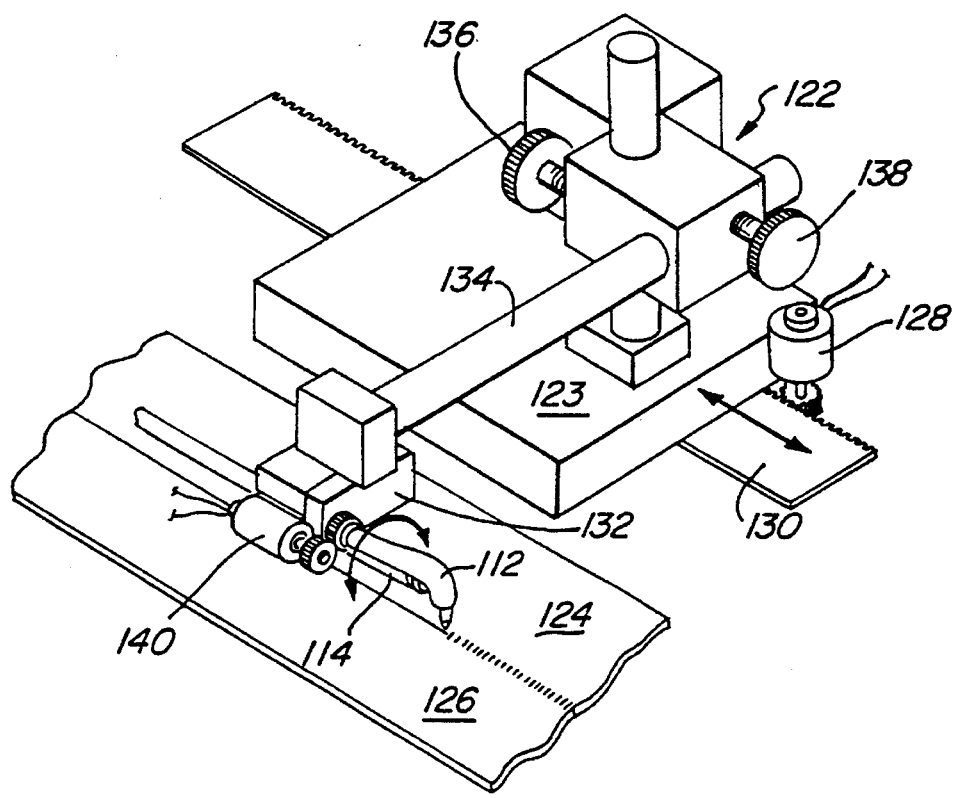
FIG. 9 is a perspective view of a tractor driven torch assembly that may be used in conjunction with the control system of FIG. 1.

When the torch of FIG. 9 is used with the control system of FIG. 1, the signals displayed on the video screen 44 will include the torch/workpiece position as well as the speed information of all three motors representing the torch speed, the wire speed and the oscillation rate (and perhaps torch dwell time on each side of the weld). As pointed out earlier, these individual parameters will be represented by different colors on the display 44.

| | | 11 DEVIATION(S) DETECTED | | |
|---|---|---|---|---|
| LOOP | LEVEL | TIME | DEGREE | CHANNEL/FAULT TYPE |
| 1 | 2 | 2.09 | 168° | *FAULT: Curnt Limit |
| 1 | 2 | 2.65 | 172° | *FAULT: Curnt Limit |
| 1 | 2 | 3.37 | 177° | *FAULT: Curnt Limit |
| 1 | 2 | 4.01 | 182° | *FAULT: Curnt Limit |
| 1 | 2 | 4.97 | 189° | *FAULT: Curnt Limit |
| 1 | 3 | 2.95 | 225° | *FAULT: Curnt Limit |
| 1 | 4 | 3.65 | 281° | *FAULT: Curnt Limit |
| 1 | 5 | 0.19 | 306° | *FAULT: Curnt Limit |
| 1 | 5 | 3.87 | 334° | *FAULT: Curnt Limit |
| 1 | 6 | 1.37 | 18° | *FAULT: Curnt Limit |
| 1 | 7 | 2.08 | 75° | KEY: Final Slope |

| Limit | Limit Times | | | High Limits | | | Low Limits | | |
|---|---|---|---|---|---|---|---|---|---|
| Type | Curnt Sec | Motor Sec | Volts Sec | Curnt % | Motor % | Volts VDC | Curnt % | Motor % | Volts VDC |
| Log | 0.04 | 0.00 | 0.00 | 4% | 0% | 0 | 4% | 0% | 0 |
| ABORT | 0.00 | 0.00 | 0.00 | 0% | 0% | 0 | 0% | 0% | 0 |

Figure 8:
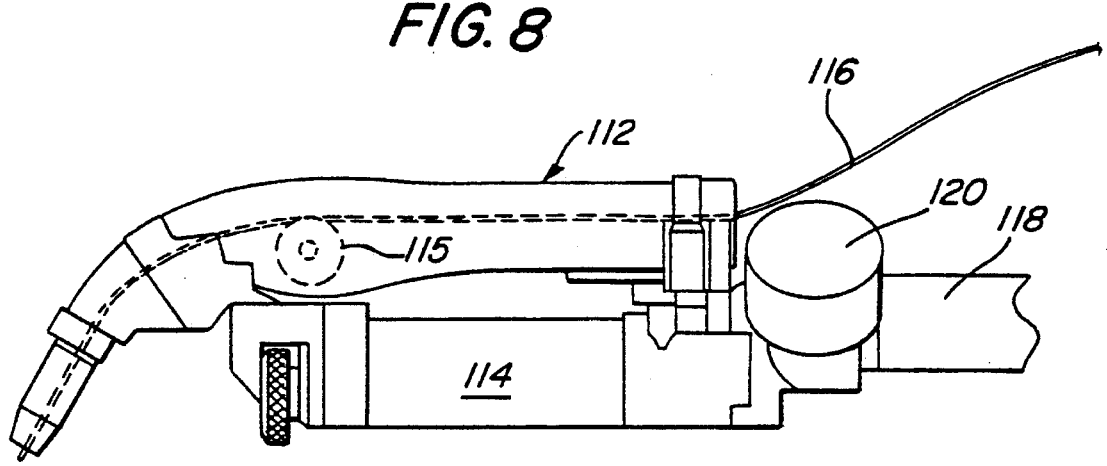
FIG. 8 is a diagrammatic view of a hand-held MIG welding torch that may be used in conjunction with the control system of FIG. 1.

Referring now to FIG. 8, MIG torch 112, which may be of the hand held type marketed by MK Products under the Cobra Gooseneck® trademark, includes a motor 114 and drive wheel 115 for feeding a consumable electrode or filler wire 116 to the weld area. The inert gas is supplied to the torch via conduit 118 and controlled by a valve (not shown) which in turn is controlled by knob 120. In this case the motor 114 can function as the motor 30 in the control system depicted in FIG. 1. When a torch such as the one shown in FIG. 8 is used with the control system of FIG. 1 the video display will normally contain the demand as well as the actual weld voltage since the electrode gap will not remain constant. The motor speed shown will represent the feed rate of the wire 116.

FIG. 9 illustrates a tractor carriage 122 having a base 123 for moving a MIG torch, such as the torch 112 shown in FIG. 8, along the edges of two plates 124 and 126 which are to be butt welded. A motor 128 mounted on the carriage 122 drives the carriage along a fixed track 130 via a suitable gear drive (as illustrated) or other arrangement. The torch 112 is rotatably mounted in a bracket 132, which in turn is carried A novel and highly useful arc welding control and display system and method has been described which among other features provides, on a real time basis, a display of the actual welding process parameters in separate colors, unacceptable deviations of such parameters from preset demand values, and the position of the welding torch relative to the workpiece. Various modifications of the system will occur to persons skilled in the art without involving any departure from the spirit and scope of the invention as described in the appended claims.

What is claimed is:

1. A method of controlling and simultaneously displaying on a video color display signals representative of the demand and actual welding parameters associated with an arc welding torch including the weld voltage, the weld current and the speed of a motor which sets the travel speed of the torch electrode relative to the workpiece or the feed rate of a consumable wire supplied to the weld area comprising:

a) selecting a demand weld voltage, weld current and motor speed;

b) supplying a weld voltage and a weld current to the torch in accordance with the selected demand values thereof;

c) selecting a demand motor speed:

d) controlling the speed of the motor in accordance with the selected demand value thereof; and e) displaying on the video color display signals representative of the selected demand values of the weld voltage, weld current and motor speed, each signal being displayed in a separate color and simultaneously displaying on the video color display, in real time, signals representative of the actual weld voltage, actual weld current and actual motor speed with the actual and demand value signals for each separate parameter being displayed in the same color, whereby an operator may readily correlate the demand and actual parameter values and ascertain deviations therebetween.

2. The method of claim 1 wherein the motor speed signal is representative of the torch electrode speed relative to the workpiece and further including generating a welding torch position signal representative of the position of the torch relative to the workpiece in real time and displaying the torch position signal on the video color display.

3. The method of claim 2 further including generating a workpiece signal representative of the shape of the workpiece and wherein the torch position signals is displayed adjacent the workpiece signal.

4. The method of claim 3 wherein the signals representative of each of the actual parameter values are in the form of analog waveforms showing changes in the respective signals over a preset time interval and further including selecting a tolerance limit for variations of the actual current from the demand current, measuring the difference between the actual current supplied to the torch and the demand current, comparing the measured difference with the selected tolerance limit and displaying on the video color display, a deviation marker signal adjacent the actual current signal, in real time, indicating each instance that the actual current exceeds the tolerance limit.

5. The method of claim 4 further including selecting a tolerance limit for variations of the actual weld voltage from the demand voltage, measuring the difference between the actual and demand weld voltage, comparing the measured difference with the selected tolerance limit and displaying on the video color display a deviation marker signal adjacent the actual voltage signal, in real time, indicating each instance that the actual voltage exceeds the tolerance limit.

6. The method of claim 5 further including displaying signals representative of the actual weld voltage, weld current and motor speed in a bar graph format in the same respective colors used to display the demand values of such parameters.

7. The method of claim 6 further including providing an electrode position signal representative of the position of the electrode relative to the workpiece and displaying on the color display said electrode position signal.

8. The method of claim 7 wherein the workpiece is tubular and wherein the motor rotates the torch electrode relative to the workpiece and further including providing a workpiece signal representative of the shape of the workpiece section being welded, and displaying the workpiece and electrode position signals on the display.

9. A system for controlling and displaying the weld process parameters for an arc welding torch having an electrode which is positioned adjacent a workpiece and an electric motor for setting the travel speed of the electrode relative to the workpiece or the feed rate of a consumable wire supplied to the workpiece, the combination comprising:

a power supply for supplying the demand weld voltage and current to the torch and for controlling the motor in accordance with the demand motor speed;

weld voltage monitoring means for providing a weld voltage signal representative of the actual voltage, supplied to the torch;

weld current monitoring means for providing a weld current signal representative of the actual current supplied to the torch;

motor speed monitoring means for providing a motor speed signal representative of the actual motor speed;

a video color display; and a controller responsive to the signals representative of the demand and actual weld voltages, the demand and actual weld currents and the demand and actual motor speeds for controlling the display to simultaneously display, in real time, each of said signals, with the signals representing the voltage being displayed in a first color, the signals representing the currents being displayed in a second color, and the signals representing the motor speeds being displayed in a third color.

10. The system of claim 9 wherein the displayed actual weld current, voltage and motor speed signals are in the form of analog waveform signals.

11. The system of claim 10 wherein the displayed actual weld current, voltage and motor speed signals are further displayed in the form of bar graph signals.

12. The system of claim 9 including means for providing a deviation limit signal to the controller representative of a prescribed deviation from a selected one of said demand weld voltage, current and motor speed parameters and wherein the controller is arranged to compare the selected demand weld parameter with the signal representative of the actual value of the selected parameter and to control the display to insert a deviation marker symbol, in real time, adjacent the displayed analog waveform signal of the selected parameter which exceeds the associated deviation limit signal.

13. The system of claim 9 wherein the motor controls the speed of travel of the torch electrode relative to the workpiece and further including means for providing a workpiece signal representative of the shape of the workpiece and means for providing an electrode position symbol representative of the position of the electrode relative to the workpiece in real time and wherein the controller is arranged to control the display to display the workpiece signal and the electrode position symbol, whereby an operator can readily ascertain from the display the position and motion of the torch electrode relative to the workpiece.

14. The system of claim 9 wherein the controller includes a data storage means, the controller being further arranged to store each of the displayed signals in the storage means whereby an operator can play back the actual weld process signals at a subsequent time.

15. The system of claim 9 further including input means for inputting signals representative of the workpiece size and wall thickness to the controller and wherein the controller is programmed to provide optimum weld voltage and current signals to the power supply.

16. The system of claim 15 wherein the controller includes a motor controller, the controller being programmed to provide an optimum demand speed signal to the motor controller.

17. The system of claim 15 further including manually operable means for inputting signals to the controller to increase or decrease the optimum demand signals.

* * * * *

UNITED STATES PATENT AND TRADEMARK OFFICE
CERTIFICATE OF CORRECTION

PATENT NO. : 5,571,431

DATED : Nov. 5, 1996

INVENTOR(S) : Louis T. Lantieri and Douglas M. Kensrue

It is certified that error appears in the above-identified patent and that said Letters Patent is hereby corrected as shown below:

Column 1, line 27, "TIC" should read --TIG--.

Column 1, line 67, "namer" should read --name,--.

Column 2, line 8, after "current" insert --,--.

Column 2, line 19, after "deviations" insert --,--.

Column 2, line 22, after "matter" insert --,--.

Column 5, line 54, before "supply" insert --power--.

Column 7, line 15, "♦" should be --$--.

Column 10, line 5, "voltage," (second occurrence) should read --voltages--.

Signed and Sealed this

Twenty-fifth Day of March, 1997

BRUCE LEHMAN

Attest:

Attesting Officer

Commissioner of Patents and Trademarks